(12) United States Patent
Schweitzer et al.

(10) Patent No.: US 9,939,022 B2
(45) Date of Patent: Apr. 10, 2018

(54) BEARING ASSEMBLY AND BEARING RING FOR ROTATABLY SUPPORTING A FIRST COMPONENT WITH RESPECT TO A SECOND COMPONENT, AND SCREW COMPRESSOR INCLUDING THE BEARING ASSEMBLY OR THE BEARING RING

(71) Applicants: Ferdinand Schweitzer, Saint Peter in der Au (AT); Simon Blasl, Losenstein (AT)

(72) Inventors: Ferdinand Schweitzer, Saint Peter in der Au (AT); Simon Blasl, Losenstein (AT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/234,280

(22) Filed: Aug. 11, 2016

(65) Prior Publication Data
US 2017/0045087 A1 Feb. 16, 2017

(30) Foreign Application Priority Data
Aug. 11, 2015 (DE) .................. 10 2015 215 296

(51) Int. Cl.
*F16C 33/66* (2006.01)
*F16C 19/06* (2006.01)
(Continued)

(52) U.S. Cl.
CPC .......... *F16C 33/6659* (2013.01); *F16C 19/06* (2013.01); *F16C 19/54* (2013.01);
(Continued)

(58) Field of Classification Search
CPC ........ F16C 19/49; F16C 19/54; F16C 19/541; F16C 33/583; F16C 33/6614; F16C 33/6622; F16C 33/6629; F16C 33/6659; F16C 33/6681; F16C 33/6685; F16C 2360/43
See application file for complete search history.

(56) References Cited

U.S. PATENT DOCUMENTS 3,195,965 A * 7/1965 Van Dorn ........... F16C 33/6662
384/475
3,388,854 A * 6/1968 Olofsson ................... F01C 1/16
418/203
(Continued)

FOREIGN PATENT DOCUMENTS

DE 102007039418 A 4/2008
DE 102013010500 A1 1/2015
(Continued)

*Primary Examiner* — Phillip A Johnson
(74) *Attorney, Agent, or Firm* — Bryan Peckjian; SKF USA Inc. Patent Dept.

(57) ABSTRACT

A bearing assembly for rotatably supporting a first component with respect to a second component includes at least one bearing including a bearing ring, at least one further component, and at least one lubricant branch structure configured to carry a lubricant to the bearing and to the further component, wherein the lubricant branch structure is at least partially disposed in the bearing ring or the lubricant branch structure is at least partially disposed in a distributor piece directly abutting the bearing ring.

17 Claims, 3 Drawing Sheets

(51) Int. Cl.
    *F16C 19/54*         (2006.01)
    *F16C 33/58*         (2006.01)
    *F16C 19/26*         (2006.01)

(52) U.S. Cl.
    CPC ............ *F16C 33/583* (2013.01); *F16C 19/26* (2013.01); *F16C 2240/30* (2013.01); *F16C 2360/43* (2013.01)

(56) References Cited

U.S. PATENT DOCUMENTS

| | | | |
|---|---|---|---|
| 4,465,446 A * | 8/1984 | Nemit, Jr. | F01C 21/02 384/588 |
| 5,273,413 A * | 12/1993 | Wallin | F01C 21/02 384/516 |
| 5,409,359 A * | 4/1995 | Takano | F01C 21/02 384/516 |
| 7,665,897 B2 | 2/2010 | Alam et al. | |
| 2007/0177835 A1 * | 8/2007 | Verhaegen | F16C 33/6651 384/462 |
| 2013/0004109 A1 | 1/2013 | Metzger et al. | |

FOREIGN PATENT DOCUMENTS

| | | |
|---|---|---|
| EP | 2657463 A1 | 10/2013 |
| JP | H10299784 A | 11/1998 |
| JP | 2009174701 A | 8/2009 |
| JP | 2009210051 A | 9/2009 |
| JP | 2010001921 A | 1/2010 |
| JP | 2013113413 A | 6/2013 |

* cited by examiner

BEARING ASSEMBLY AND BEARING RING FOR ROTATABLY SUPPORTING A FIRST COMPONENT WITH RESPECT TO A SECOND COMPONENT, AND SCREW COMPRESSOR INCLUDING THE BEARING ASSEMBLY OR THE BEARING RING

CROSS-REFERENCE

This application claims priority to German patent application no. 10 2015 215 296.0 filed on Aug. 11, 2015, the contents of which are fully incorporated herein by reference.

TECHNOLOGICAL FIELD

The present disclosure is directed to a bearing assembly and a bearing ring for rotatably supporting a first component with respect to a second component, and to a screw compressor including the bearing assembly or the bearing ring.

BACKGROUND

Bearing assemblies are used in a variety of environments for rotatably supporting a wide variety of components. Many of these applications require lubrication.

In many conventional bearing assemblies, and also in screw compressors, the supplying of lubricant to a plurality of bearing points is divided and regulated via so-called oil-injection rings. For this purpose, for example, rings including openings are disposed in the axial direction between two bearing rings, through which rings a lubrication line is guided radially inward to the raceways of the rolling elements. Further lubrication lines are guided to other components that are to be lubricated, for example, seals, gears, screws, and/or regions of the component supported by the bearing assembly that lie outside the bearing assembly.

Under certain circumstances this can require the use of very long lubrication lines. Under certain circumstances the axial and/or radial installation space required for the bearing assembly may increase.

There is therefore a need to improve a bearing assembly, in particular with regard to lubrication.

SUMMARY

Exemplary embodiments relate to a bearing assembly for rotatably supporting a first component with respect to a second component. For this purpose the bearing assembly includes at least one bearing and at least one further component. In addition, the bearing assembly includes at least one lubricant branch structure (branch point), which is configured to guide lubricant to the bearing and to the further component, wherein the lubricant branch structure is disposed at least partially in a bearing ring of the bearing. Since the lubricant branch structure is at least partially disposed in the bearing ring, in some exemplary embodiments it may be possible to reduce the number of lubrication lines used. In other words it may be possible, for example, to lubricate an entire bearing assembly and also lubricate another component that is supported, for example, by the bearing assembly, via a single lubrication line.

The lubricant branch structure can be, for example, any component or subassembly that is configured to dispense a lubricating medium in at least two different directions and/or to lubricate two different components, for example, the component and the bearing, or to dispense the lubricant in their direction. For this purpose a volume flow of the lubricant can be divided into same-size or even different-size volume flows. The lubricant branch structure can possibly include at least one bore of the bearing ring, which bore is disposed concentric to the axis of rotation of the bearing ring and/or has a smaller diameter than its inner bore. Further lubrication openings that direct the lubricating medium to the component other than the bearing can possibly also be provided in the bearing ring and/or a distribution piece that is disposed with a material contact to the bearing ring.

In some exemplary embodiments the distributor piece is configured and disposed to lubricate the at least one bearing and one further component using a lubricating medium. At least one of the bearing rings of the bearing includes at least one lubrication opening. The lubrication opening is, for example, disposed eccentrically with respect to an axis of rotation and/or at an angle to an axis of rotation of the bearing ring. The lubricating medium can enter through the lubricant opening via the distributor piece into the bearing.

The further component can be any component, for example, the first component or a region of the first component that lies outside the bearing assembly or the bearing of the bearing assembly in the axial and/or radial direction. Additionally or alternatively the further component can also be, for example, a screw, for example, of a screw compressor, a gear, a seal, a cage-guiding surface, and/or an inner ring of one of the bearings. The further component can be exactly one component and/or also a combination of components. The two components are rotatably supported with respect to each other, for example, if the two components are disposed concentric to each other, and the first component rotates about its axis of rotation, and the second component is stationary. Additionally or alternatively the second component can also perform a rotational movement, or both components can perform rotational movements in different directions and/or with different rotational speeds.

In addition, the distributor piece can be disposed such that it abuts radially at least sectionally on the bearing ring, for example, the outer ring of the bearing. In some exemplary embodiments it can thus be made possible that the distributor piece is aligned with the lubrication opening in the bearing ring, and/or that an installation space of the bearing assembly and/or a lubrication-line length is reduced as much as possible.

Additionally or alternatively the distributor piece can also abut in the axial direction on the bearing ring, for example, the outer ring. In some exemplary embodiments an installation space can also optionally be reduced in the axial direction.

Additionally or alternatively the bearing assembly can provide a second bearing, wherein the distributor piece abuts at least sectionally in the axial and/or in the radial direction on an outer ring of the second bearing. Thus in some exemplary embodiments under certain circumstances a spacer, which, for example, in conventional bearing assemblies is often disposed between the bearing and a second bearing, can be omitted. In addition, in some exemplary embodiments it can thus also be made possible that via the distributor piece the lubricating medium can be introduced both into the first and also into the second bearing. For example, the lubricating medium can be introduced into the second bearing through a concentric bore of the outer ring. Under certain circumstances an outer- and/or an inner-ring of the second bearing can then be free of lubrication openings. For example, the lubrication opening is not a concentric bore of the outer ring into which the inner ring and the rolling elements are inserted, but rather a bore disposed eccentric and/or at an angle to the axis of rotation. For example, the distributor piece can abut completely on an axial extension of the bearing ring and/or completely on a radial extension of the bearing ring. Under certain circumstances the distributor piece can also only sectionally abut on the described side surfaces of the bearing ring.

In some exemplary embodiments the distributor piece includes at least one distributor bore through which the lubricating medium is directed to the first bearing and/or the other component and/or the second bearing. This distribution opening can, for example, be aligned with the lubrication opening in the bearing ring. In some further exemplary embodiments the distributor piece can include at least two or at least three distributor bores, or even exactly three distributor bores. For example, the distributor bore that aligns with the lubrication opening can connect directly to the bearing ring, i.e., without further intermediate elements disposed between distributor piece and bearing ring.

In some exemplary embodiments at least one of the bearing rings includes at least two or exactly two lubrication openings, wherein at least one of the lubrication openings emerges at an end surface of the bearing ring that is directed in an axial direction. Under certain circumstances the end surface can also only have an axial direction component. In some exemplary embodiments it can be made possible that either the other component and/or the other bearing, which are disposed, for example, in the axial direction adjacent to the bearing including the lubrication opening, can be lubricated via the distributor piece and the lubrication opening that emerges at the axial end surface. In this exemplary embodiment the lubricant branch structure can possibly be completely disposed in the bearing ring and a distributor piece can be omitted. This exemplary embodiment can optionally also comprise the distributor piece. For example, the distributor piece can serve as a supply line for the lubrication openings in the bearing ring.

In some exemplary embodiments the bearing ring can include at least or exactly three lubrication openings, wherein two of the lubrication openings emerge respectively at end surfaces of the bearing ring, which end surfaces oppose each other in the axial direction. The lubrication openings can thus extend, for example, from a radially outwardly directed surface of the bearing ring up to an end surface directed in the axial direction. Under certain circumstances the lubricant openings can be disposed with or without crossing each other (intersecting). In this exemplary embodiment the lubricant branch structure can possibly be disposed in the bearing ring and a distributor piece can be omitted. This exemplary embodiment can also optionally provide the distributor piece. For example, the distributor piece can serve as a supply line for the lubrication openings in the bearing ring.

In some exemplary embodiments all lubrication openings can lie at one height, i.e., the same angle, in the circumferential direction. Optionally at least two lubrication openings can also be offset with respect to each other in the circumferential direction, i.e., for example, spaced from each other by an angle. The lubrication opening can be, for example, a bore having all possible cross-sectional shapes, for example, circular. The diameter of the lubrication opening can be smaller by a factor of 5, 10, 100, 200, 500 than an outer diameter of the outer ring of the bearing. The third lubrication opening can optionally lead to a raceway of the bearing ring. The third lubrication opening can be disposed, for example, in the axial direction between the first and the second lubrication opening.

Additionally or alternatively one of the distributor bores of the distribution piece can be flush with at least one of the lubrication openings. Under certain circumstances the distributor bore can also widen radially inward such it guides the lubricating medium to all three lubrication openings. For example, the distributor piece may then only include a single distributor bore.

Additionally or alternatively in some exemplary embodiments the lubrication opening is disposed perpendicular to an axis of rotation of the bearing assembly. Under certain circumstances the lubrication opening can also be disposed at an angle of at least 1°, 10°, 20°, 45°, 50°, 60°, 70°, 75°, 85° or 90° to the axis of rotation.

In some exemplary embodiments the lubrication opening can be disposed such that the bearing including the lubrication opening is lubricated by it and lubricating medium can be introduced via the distributor piece. Additionally or alternatively the bearing that includes the bearing ring including the at least one lubrication opening can be a ball bearing and/or the second bearing can be a cylindrical roller bearing. Under certain circumstances particularly good bearing properties of the bearing assembly can thus be achieved. In a further exemplary embodiment the two bearings can also be of the same design and/or be any other bearings, for example, also tapered roller bearings.

Additionally or alternatively in some exemplary embodiments the distributor piece can include at least three distributor bores via which the first bearing, the second bearing, and the further component can be lubricated, wherein at least one of the two bearings includes an outer ring including a lubrication opening, through which the lubricating medium can enter into the bearing and at least one of the distributor bores is flush with the lubrication opening. In some exemplary embodiments it can thus be made possible that lubricating medium can be introduced via the distributor bore through the lubrication opening of the bearing ring into the first bearing, and the lubricating medium can be directed via further distributor bores in the distributor piece to the other component and to the second bearing. In some exemplary embodiments the lubricating medium that is directed to the further component and the second bearing does not flow through the bearing ring, but escapes from the distributor piece or its distributor bores into an environment and flows without further aids or guidance to the second bearing or its interior and the further component.

Exemplary embodiments also relate to a bearing ring for a bearing for rotatably supporting a first component with respect to a second component. The bearing ring provides at least two lubricant openings, wherein a first lubricant opening emerges at a first axial end surface of the bearing ring. In some exemplary embodiments the bearing ring can thus also be used for lubricating components other than the bearing.

The lubrication opening can, for example, connect a radially outwardly directed surface of the bearing ring to the axial end surface of the bearing ring. Additionally or alternatively the bearing ring can also include a further lubrication opening that emerges at a second axial end surface opposing the first axial end surface in the axial direction. In some exemplary embodiments all or at least two lubrication openings of the bearing ring can lie at the same height in the circumferential direction. In some exemplary embodiments the lubricant connection can thus be effected at exactly one point. Additionally or alternatively at least two lubricant openings can have a spacing in the circumferential direction of at least 1°, 2°, 3°, 4°, 5°, 6°, 7° up to 15°.

Exemplary embodiments also relate to a screw compressor including a bearing assembly according to one of the preceding exemplary embodiments or a including bearing ring according to one of the preceding exemplary embodiments, wherein the first component and/or the further component are a rotor of the screw compressor. In some exemplary embodiments it can thus be made possible that a supplying of lubricant is better integrated in a bearing assembly. In other words a dividing can possibly be effected by integration of the distributing ring into the bearing rings.

Another embodiment includes a bearing assembly for rotatably supporting a first component with respect to a second component. The assembly includes at least one bearing having a bearing ring and a raceway and at least one further component. The at least one lubricant branch structure is configured to carry a lubricating medium to the raceway and to dispense the lubricating medium toward the further component. The lubricant branch may be located entirely in the bearing ring.

The exemplary embodiments and their individual features disclosed in the above description, the following claims, and the accompanying Figures can be meaningful and implemented both individually and in any combination for the realization of an exemplary embodiment in its various designs.

BRIEF DESCRIPTION OF THE DRAWINGS

The Figures thus schematically show the following views.

DETAILED DESCRIPTION

In the following description of the accompanying Figures, like reference numbers refer to like or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

Figure 1:
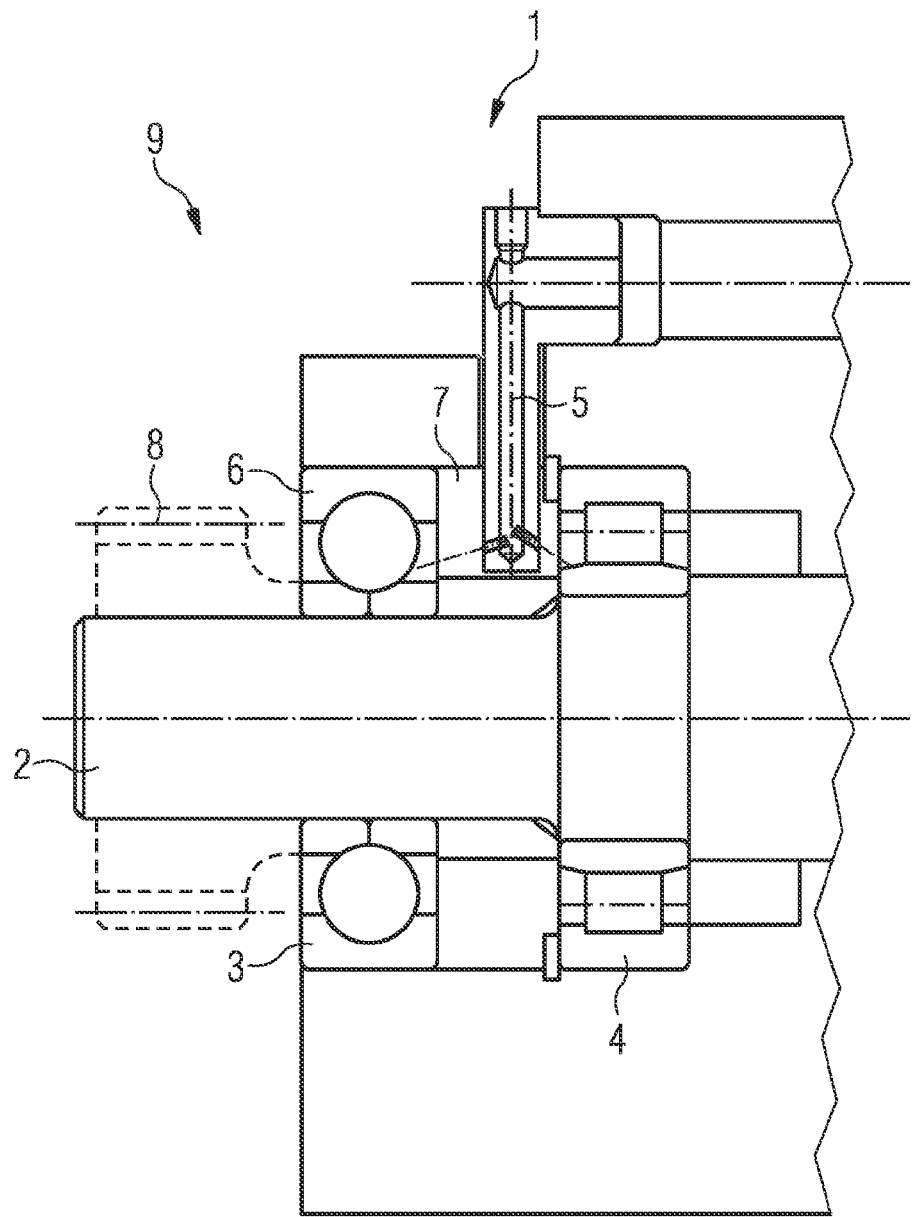
FIG. 1 shows a schematic cross-sectional depiction of a conventional bearing assembly.

FIG. 1 shows a schematic cross-sectional view of a conventional bearing assembly 1. In this bearing assembly 1 a screw, as first component 2, of a screw compressor is rotatably supported with respect to a not-depicted housing. For this purpose a spherical roller bearing 3 and a cylindrical roller bearing 4 are disposed. To lubricate the bearing assembly 1 a lubrication line 5 is guided through a lubrication ring 6 or an opening 7 in the lubrication line 6 in the axial direction between the two bearings 3 and 4. A gear 8 of the screw or a thread is lubricated via a further lubrication line 9. A plurality of lubrication points is thus supplied with long lubrication lines.

Figure 2:
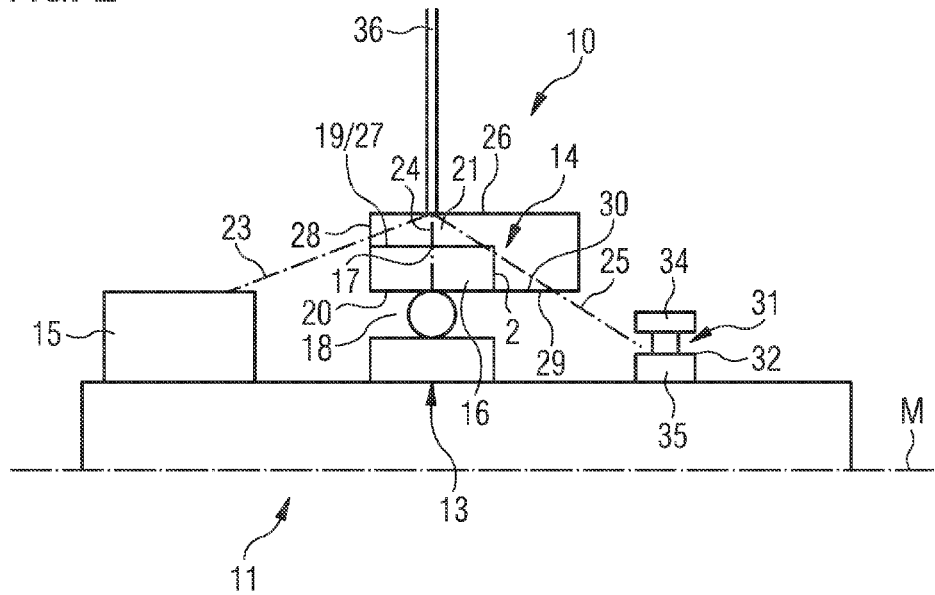
FIG. 2 shows a schematic cross-sectional depiction of a bearing assembly according to an exemplary embodiment.

FIG. 2 shows a schematic cross-sectional depiction of a bearing assembly 10 according to an exemplary embodiment. For rotatably supporting a first component 11 with respect to a second, not-depicted component the bearing assembly 10 includes at least one bearing 13 and a distributor piece 14. The distributor piece 14 is configured and disposed to lubricate the at least one bearing 13 and to also lubricate a further component 15 using a not-depicted lubricating medium. At least one of the bearing rings 16 of the bearing 13 includes at least one lubrication opening 17 which is depicted in dashed line. Through the lubrication opening 17 lubricating medium can enter into the bearing 13 via the distributor piece 14. The lubricant branch structure thus provides the distributor piece 14 and the bearing ring 16 or the lubrication openings disposed in one of these components.

In the exemplary embodiment of FIG. 2 the first component 11 is a screw of a screw compressor. Here the screw, like the other component 15, is located in the axial direction outside a region at which the bearing 13 is disposed. In a further, not-depicted exemplary embodiment the first component can also be a shaft or any other component, for example, a seal, a gear, and/or another bearing or an inner ring of the bearing 13 or of the bearing, whose outer ring includes a lubrication opening.

In the exemplary embodiment of FIG. 2 the bearing 13 is a tapered roller bearing including a split inner ring. In a further, not-depicted exemplary embodiment the bearing can also include a continuous inner ring and/or rolling elements of another shape. The lubricating medium can be any medium or liquid, for example, a lubricant, an oil, a grease, water, and/or another liquid mixture.

The lubrication opening 17 extends from a radially outwardly directed surface 19 of the bearing outer ring 16 to a radially inwardly directed surface 20 of the bearing outer ring 16. The lubrication opening is thus a bore that penetrates the bearing ring. The lubricating medium is thus guided by the distributor piece directly onto a raceway of the outer ring 16, which is located on the surface 20. The lubrication opening 17 is eccentrically and at an angle to a bore 18 of the bearing ring 16 or to an axis of rotation M. The lubrication opening 17 also lies outside the bore 18 and has a smaller diameter than it.

The distributor piece 14 has an angular shape in cross-section and abuts with a first arm 21 on the radially outwardly directed surface 19 of the outer ring 16. A second arm 30 of the distributor piece 14 abuts in the axial direction on an end surface of the bearing ring 16, which end surface faces in the axial direction. The distributor piece 14 provides three distributor bores 23, 24, and 25. The distributor bore 24 is aligned with the lubrication opening 17 and extends from a radially outwardly directed surface 26 of the distributor piece 14 to a radially inwardly directed surface 27 of the distributor piece 14. Here the distributor bore 24 is disposed at an angle to the axis of rotation M, wherein the angle is greater than 45° and less than 100°. In some further, not-depicted exemplary embodiments the distributor bore 24 can also be disposed perpendicular to the axis of rotation M.

The distributor bore 23 extends from the radially outwardly directed surface 26 to an axial end surface 28 of the distributor piece 14. The distributor bore 23 is configured and disposed to transport lubricating medium to the further components 15. No further directing element or the like is provided between the further component 15 and the distributor piece 14. In some further, not-depicted exemplary embodiments such further directing elements can be provided. In an analogous manner the distributor piece 14 abuts directly on the outer ring 16. No further intermediate elements are provided.

The distributor bore 25 extends from the radially outwardly directed surface 26 to a radially inwardly directed surface 29 of the second arm 30. The distributor bore 25 is thus configured and disposed to guide the lubricating medium laterally into an interior of a second bearing 31. Here the first bearing 13, which includes the bearing ring 16 including the lubrication opening 17, is disposed in the axial direction between the second bearing 31 and the other component 15. The lubricating medium is not introduced via a lubrication opening in one of the bearing rings in the second bearing 31, but rather through a concentric bore 32 of the outer ring 34 between the outer ring 34 and the inner ring 35 of the second bearing 31. In the exemplary embodiment of FIG. 2 the second bearing is a cylindrical roller bearing.

In further, not-depicted exemplary embodiments the second bearing 31 can also be any other bearing, for example, a tapered roller bearing or a spherical roller bearing. In some further, not-depicted exemplary embodiments the second bearing 31 can also be omitted. Furthermore, in some exemplary embodiments one of the lubrication openings 23 and/or 24 can be omitted. In some exemplary embodiments the distributor piece can include exactly one distributor bore configured to introduce the lubricating medium into a lubrication opening of the bearing ring. The distributor bore can optionally be configured to dispense lubricating medium at a surface of the distributor piece, which surface is directed in the axial direction, either onto a further bearing or another component.

In the exemplary embodiment of FIG. 2 the distributor bores 23, 24 and 25 are disposed such that they align or meet at a common point on the radially outwardly directed surface 26 of the distributor part 14 so that a lubrication line 36 can be guided to a connection point. The distributor bores 23, 24, 25, like the lubrication opening 17, are also disposed in the circumferential direction at a common height. In some further, not-depicted exemplary embodiments the bores can also be disposed in the circumferential direction in an angular range from 0.1° to 10°. In some further, not-depicted exemplary embodiments the distributor bores can also start spaced from one another in the axial direction at the radially outwardly directed surface of the distributor piece.

The distributor piece 14 is attached to the housing or to the second component 15 via a not-depicted screw connection. The second component 15 can be, for example, a housing, and/or the like.

Figure 3:
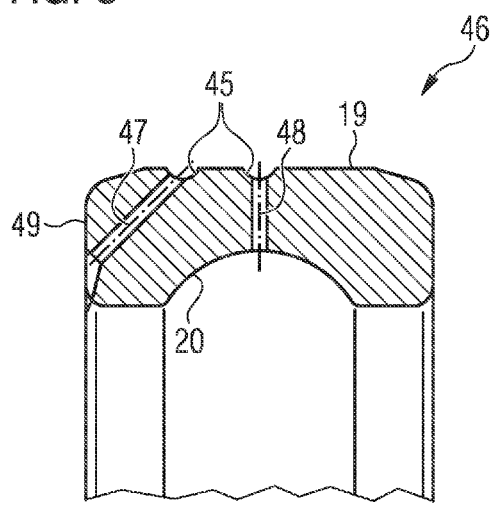
FIG. 3 shows a schematic cross-sectional depiction of a bearing ring according to an exemplary embodiment.

FIG. 3 shows a schematic cross-sectional depiction of a bearing ring 46 for a not-depicted bearing according to an exemplary embodiment. Here it is an outer ring. Components identical or similar to those in the bearing ring 16 of FIG. 2 are designated by identical reference numbers as in the exemplary embodiment of FIG. 2.

The bearing ring 46 includes two lubrication openings 47 and 48. The lubrication opening 47 leads from a radially outwardly directed surface 19 to the axial end side 49. The lubrication opening 48 leads from the radially outwardly directed surface 19 to the radially inwardly directed surface 20. The lubrication opening 47 is disposed such that it is located outside a raceway of a radially inwardly oriented surface 20. The lubrication opening 48 leads directly to the raceway and is disposed in the axial direction M symmetrically or centrally with respect to the raceway. In some further, not-depicted exemplary embodiments the lubrication opening can also be disposed asymmetrically with respect to the raceway.

Semicircular recesses 45 are located on the radially outwardly directed surface 19 both in a region of the lubrication opening 47 and in a region of the lubrication opening 48. In some exemplary embodiments the introducing of the lubricating medium into the lubrication openings 47 and 48 can thus be facilitated. In some further, not-depicted exemplary embodiments the semicircular recesses can also have another shape and/or be omitted. The bearing ring 46 is a bearing ring for a ball bearing. In some further, not-depicted exemplary embodiments it can also be a bearing ring for any other bearing, tapered roller bearing, single row and/or multi-row bearing.

For example, the bearing ring 46 can be used in combination with a corresponding, not-depicted distributor piece. The distributor piece can include, for example, at least one distributor bore, via which the lubricating medium is introduced into the lubrication openings. For example, the distributor piece can then itself include distributor bores in order to introduce lubricating medium, for example, into a second bearing. Under certain conditions the lubricating medium can also be exclusively distributed via the bearing ring 46 and not via the distributor piece. In some exemplary embodiments the lubricating medium can be introduced only via the not-depicted distributor piece into the lubrication openings 47 and 48 of the bearing ring.

Figure 4:
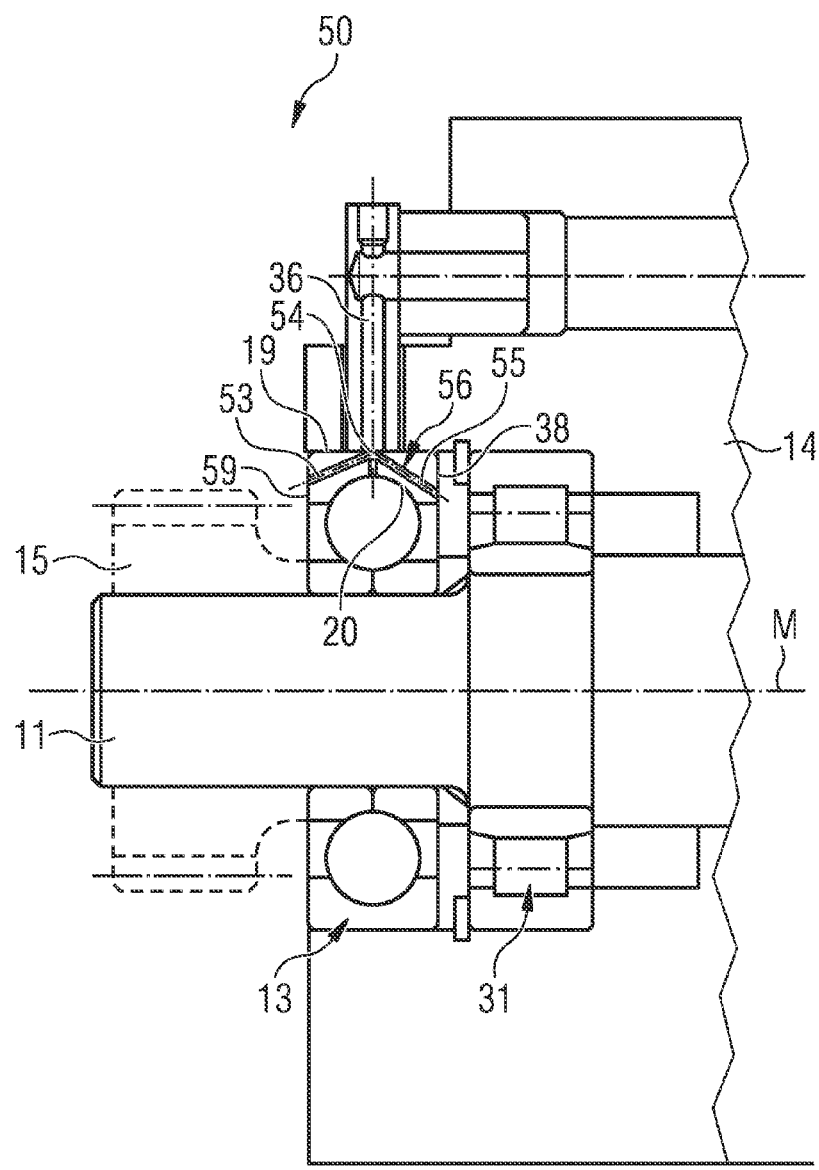
FIG. 4 shows a schematic cross-sectional view of a bearing assembly according to a further exemplary embodiment.

FIG. 4 shows a schematic cross-sectional view of a bearing assembly 50 according to an exemplary embodiment. The bearing assembly 5 is essentially similar to the bearing assembly 10 of FIG. 2 and differs by, among other things, a bearing ring 56 that fully provides the lubricant branch structure. In other words, the lubrication branch structure is formed in the bearing ring 56 itself rather than in a separate distributor piece. The bearing ring 56 is an outer ring for the first bearing 13. Components identical and/or similar to those in the exemplary embodiment of FIG. 2 are designated by identical reference numbers as in the exemplary embodiment of FIG. 2.

In contrast to the exemplary embodiment of FIG. 2 the lubricating medium is not dispensed to the further component 15 and the second bearing 31 via distributor bores of a distributor piece. No distributor piece is used. Instead, the lubricating medium is guided via the lubricant line 36 directly onto a radially outwardly directed surface of the outer ring 53 and in an angular range wherein this provides the lubricant branch structure.

As lubricant branch structure the bearing ring 56 includes three lubrication openings 53, 54, and 55. In a manner analogous to the lubricant opening 24, the lubricant opening 54 leads from the radially outwardly directed surface 19 to the radially inwardly directed surface 20 of the bearing ring 56. The first lubrication opening 53 leads from the radially outwardly directed surface 19 to an end surface 59 of the bearing ring 56, which end surface 59 is facing in the axial direction. Here the end surface 59 is the end surface of the bearing 13, which end surface faces the other component 15. Lubricating medium can be dispensed via the lubrication opening 53 to the other component 15 or also to the bearing inner ring of the bearing 13.

In an analogous manner the third lubrication opening 55 leads from the radially outwardly directed surface 19 to an end surface 38 of the bearing ring 56, which end surface 38 faces away from the end surface 59 in the axial direction. The lubricating medium is introduced into the second bearing 31 via the lubrication opening 55. Here the end side 38 is the end side 38 facing the second bearing 31. The lubrication openings 53 to 55 are disposed such that they start at a common point on the radially outwardly directed surface 19. In some further, not-depicted exemplary embodiments the lubrication openings 53 to 55 can also be fully spaced from one another in the axial direction. In some further, not-depicted exemplary embodiments the lubrication openings can also be disposed such that at least two or even all three start at a common point on the radially outwardly directed surface.

In other words, in some exemplary embodiments a novel bearing geometry is used, which under certain circumstances can make it possible that the lubricant can directly reach the bearing point inside the bearing. Furthermore, under certain circumstances in some exemplary embodiments the possibility can be created to lubricate further lubrication points in the direct vicinity of the bearing, such as, for example, an adjacent bearing (for example a CRB), cage-guiding surface, or, for example, also a gear. In addition, in some exemplary embodiments separate oil-injection rings or a separate supplying of oil, which have been necessary with conventional bearing assemblies, can be omitted. In some exemplary embodiments an improved supplying of lubricating oil can be made possible because it is effected directly by the outer ring. Thus in some exemplary embodiments under certain circumstances churning losses and/or friction can be reduced.

Due to the direct and highly targeted supplying of lubricant, in some exemplary embodiments the lubrication points can be optimized precisely and in a targeted manner with respect to lubricating. In some exemplary embodiments a power loss and/or frictional loss of the bearing or of the bearing assembly or the bearing point and thus of an application, such as, for example, screw compressors, can be reduced. The lubrication openings and/or also the distributor openings can be produced, for example, by soft machining or using electrical discharge machining. The distributor piece and/or also the bearing ring can be manufactured, for example, from a metal, a steel.

However, the bearing assembly or the bearing ring can be used not only in screw compressors as described in the Figures, but also in all possible other bearing assemblies that provide rolling-element bearings (for example, ACBBs, CRBs, MRBs and/or TRBs). Applications can be, for example, the supporting of shafts, spindles, components of machine tools, transport devices, vehicles, or the like.

The exemplary embodiments and their individual features disclosed in the above description, the following claims, and the accompanying Figures can be meaningful and implemented both individually and in any combination for the realization of an exemplary embodiment in its various designs.

In some further exemplary embodiments, features that are disclosed in other exemplary embodiments as device features can also be implemented as method features. Furthermore, features that are implemented in some exemplary embodiments as method features can also optionally be implemented in other exemplary embodiments as device features.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing lubrication arrangements.

REFERENCE NUMBER LIST

1 Bearing assembly
2 First component
3 Spherical roller bearing
4 Cylindrical roller bearing
5 Lubrication line
6 Lubrication ring
7 Opening
8 Screw
9 Further lubrication line
10 Bearing assembly
11 First component
13 Bearing
14 Distributor piece
15 Further components
16 Bearing ring
17 Lubrication opening
18 Bore
19 Radially outwardly directed surface
20 Radially inwardly directed surface
21 First arm
23 Distributor bore
24 Distributor bore
25 Distributor bore
26 Radially outwardly directed surface
27 Radially inwardly directed surface
28 Distributor-piece end surface
29 Distributor-piece end surface
30 Second arm
31 Second bearing
33 Second-bearing outer-ring bore
34 Outer ring
35 Inner ring
36 Lubrication line
38 Axial end surface
45 Recess
46 Bearing ring
47 Lubrication opening
48 Lubrication opening
49 Axial end side
50 Bearing assembly
53 Lubrication opening
54 Lubrication opening
55 Lubrication opening
56 Bearing ring
59 End surface
M Axis of rotation
α Lubrication-opening angle

What is claimed is:

1. A bearing assembly for rotatably supporting a first component with respect to a second component, the bearing assembly comprising:
   at least one bearing including a bearing ring having a raceway;
   at least one further component; and
   at least one lubricant branch structure configured to lubricate the bearing and the further component,
   wherein the lubricant branch structure is at least partially disposed in the bearing ring or wherein a distributor piece abuts the bearing ring and the lubricant branch structure is at least partially disposed in the distributor piece; and
   wherein the bearing ring or the distributor piece includes at least three distributor bores configured to lubricate the at least one bearing, a second bearing, and the further component.

2. The bearing assembly according to claim 1, wherein the lubricant branch structure is at least partially disposed in the distributor piece.

3. The bearing assembly according to claim 2, wherein the lubricant branch structure is configured to carry a lubricating medium, and wherein the at least one bearing includes at least one lubrication opening through which the lubricating medium can enter into the bearing from the distributor piece.

4. The bearing assembly according to claim 3, wherein the distributor piece includes a first bore aligned with one of the at least one lubrication opening and/or wherein the at least one lubrication opening extends perpendicular to an axis of rotation or extends at an angle of 1° to 90° to the axis of rotation and/or the at least one lubrication opening extends to a raceway of the bearing ring.

5. The bearing assembly according to claim 2, wherein the distributor piece radially and/or axially abuts at least sectionally on the bearing ring.

6. The bearing assembly according to claim 2, wherein the distributor piece abuts in the axial and/or in the radial direction at least sectionally on an outer ring of the second bearing.

7. The bearing assembly according to claim 2, wherein the bearing ring includes at least two lubrication openings, and wherein one of the at least two lubrication openings is located at an axial end surface of the bearing ring.

8. The bearing assembly according to claim 2, wherein the bearing ring includes a first lubrication opening, a second lubrication opening and a third lubrication opening, wherein the first lubrication opening is located at a first axial end surface of the bearing ring and the second lubrication opening is located at a second axial end surface of the bearing ring opposite the first axial end surface.

9. The bearing assembly according to claim 2,
wherein the at least one bearing includes at least one lubrication opening through which a lubricating medium can enter into the bearing from the distributor piece,
wherein the distributor piece radially and/or axially abuts at least sectionally on the bearing ring,
wherein the distributor piece includes a first distributor bore, a second distributor bore and a third distributor bore for lubricating the at least one bearing, the second bearing, and the further component, and
wherein the first distributor bore is aligned with at least one lubrication opening.

10. The bearing assembly according to claim 1, wherein the at least one bearing is a ball bearing and wherein the second bearing is a cylindrical roller bearing.

11. The bearing assembly according to claim 1, wherein the lubricant branch structure is disposed entirely in the bearing ring.

12. A screw compressor including the bearing ring according to claim 1, wherein the first component or the further component is a rotor of the screw compressor.

13. The bearing assembly according to claim 1, wherein the lubricant branch structure is configured to carry a lubricating medium to the raceway and to dispense the lubricating medium toward the further component.

14. A bearing ring for a bearing assembly for rotatably supporting a first component with respect to a second component, the bearing ring comprising at least two distributor bores, wherein a first distributor bore of the at least two distributor bores has at least one lubrication opening located at a first axial end surface of the bearing ring.

15. A bearing assembly for rotatably supporting a first component with respect to a second component, the bearing assembly comprising:
at least one bearing including a bearing ring and a raceway;
at least one further component; and
at least one lubricant branch structure configured to lubricate the bearing and the further component,
wherein the lubricant branch structure is located entirely in the bearing ring; and
wherein the bearing ring includes a first lubrication opening, a second lubrication opening and a third lubrication opening, wherein the first lubrication opening is located at a first axial end surface of the bearing ring and the second lubrication opening is located at a second axial end surface of the bearing ring opposite the first axial end surface.

16. The bearing assembly according to claim 15, wherein the lubricant branch structure is configured to carry a lubricating medium to the raceway and to dispense the lubricating medium toward the further component.

17. The bearing assembly according to claim 16, including a distributor piece directly abutting the bearing ring and configured to carry the lubricating medium to the at least one lubricant branch structure.

* * * * *